(12) United States Patent
Caceres et al.

(10) Patent No.: US 7,277,937 B2
(45) Date of Patent: Oct. 2, 2007

(54) DISTRIBUTED COMPUTING USING SYSCALL PROXYING

(75) Inventors: Maximiliano Gabriel Caceres, Buenos Aires (AR); Javier Burroni, Buenos Aires (AR); Gustavo Ajzenman, Buenos Aires (AR); Ricardo Quesada, Buenos Aires (AR); Gerardo Gabriel Richarte, Buenos Aires (AR); Luciano Notarfrancesco, Buenos Aires (AR); Bruce Robert Leidl, Buenos Aires (AR); Agustin Azubel Friedman, Buenos Aires (AR); Gabriel Martin Becedillas Ruiz, Buenos Aires (AR)

(73) Assignee: Core SDI, Incorporated, Boston, MA (US)

( * ) Notice: Subject to any disclaimer, the term of this patent is extended or adjusted under 35 U.S.C. 154(b) by 985 days.

(21) Appl. No.: 10/621,840

(22) Filed: Jul. 16, 2003

(65) Prior Publication Data
US 2004/0128667 A1 Jul. 1, 2004

Related U.S. Application Data

(60) Provisional application No. 60/396,813, filed on Jul. 17, 2002.

(51) Int. Cl.
*G06F 15/173* (2006.01)
(52) U.S. Cl. .................. 709/223; 709/225; 709/227
(58) Field of Classification Search ............. 709/223, 709/225, 227
See application file for complete search history.

(56) References Cited

U.S. PATENT DOCUMENTS 5,600,790 A   2/1997   Barnstijn et al. ...... 395/183.14
5,812,529 A   9/1998   Czarnik et al. ............. 370/245
5,892,903 A   4/1999   Klaus ..................... 395/187.01

(Continued)

FOREIGN PATENT DOCUMENTS

WO      WO99/66383      12/1999

(Continued)

*Primary Examiner*—Jason Cardone
*Assistant Examiner*—Adnan M. Mirza
(74) *Attorney, Agent, or Firm*—Peter A. Nieves; Sheehan, Phinney, Bass + Green, P.A.

(57) ABSTRACT

A system is provided for executing a system call originating in a local computer on a first remote computer connected to the local computer via a network. Communication is established between the local computer and the first remote computer via the network. A syscall server is installed in the first remote computer. A reference address is sent from the first remote computer to the local computer via the network through execution of code by the syscall server. A syscall request is built in the local computer with arguments determined using the reference address received from the first remote computer. The syscall request is sent from the local computer to the first remote computer via the network. The syscall request is copied into a stack of the first remote computer through execution of code by the syscall server. Registers are popped from the syscall request in the stack. Execution of a syscall request is initiated on the first remote computer. The result of the syscall request is pushed onto the stack. At least a portion of the result of the syscall request is sent to the local computer via the network through execution of code by the syscall server.

13 Claims, 7 Drawing Sheets

U.S. PATENT DOCUMENTS

| | | | |
|---|---|---|---|
| 5,961,644 A | 10/1999 | Kurtzberg et al. | 713/200 |
| 6,009,456 A | 12/1999 | Frew et al. | 709/202 |
| 6,070,244 A | 5/2000 | Orchier et al. | 713/201 |
| 6,081,665 A | 6/2000 | Nilsen et al. | 395/705 |
| 6,108,715 A | 8/2000 | Leach et al. | 709/330 |
| 6,125,390 A | 9/2000 | Touboul | 709/223 |
| 6,137,782 A | 10/2000 | Sharon et al. | 370/255 |
| 6,185,689 B1 | 2/2001 | Todd, Sr. et al. | 713/201 |
| 6,202,199 B1 | 3/2001 | Wygodny et al. | 717/4 |
| 6,205,122 B1 | 3/2001 | Sharon et al. | 370/254 |
| 6,205,551 B1 | 3/2001 | Grosse | 713/201 |
| 6,205,552 B1 | 3/2001 | Fudge | 713/201 |
| 6,249,886 B1 | 6/2001 | Kalkunte | 714/47 |
| 6,286,047 B1 | 9/2001 | Ramanathan et al. | 709/224 |
| 6,298,445 B1 | 10/2001 | Shostack et al. | 713/201 |
| 6,301,668 B1 | 10/2001 | Gleichauf et al. | 713/201 |
| 6,408,391 B1 | 6/2002 | Huff et al. | 713/201 |
| 6,636,898 B1 * | 10/2003 | Ludovici et al. | 709/250 |
| 2002/0019864 A1 * | 2/2002 | Mayer | 709/223 |
| 2003/0014669 A1 | 1/2003 | Caceres et al. | 713/201 |
| 2003/0149741 A1 | 8/2003 | Krooss | 709/217 |

FOREIGN PATENT DOCUMENTS

| | | |
|---|---|---|
| WO | WO 01/33353 A2 | 5/2001 |

* cited by examiner

DISTRIBUTED COMPUTING USING SYSCALL PROXYING

This application claims the benefit of U.S. Provisional Application No. 60/396,813 filed Jul. 17, 2002.

BACKGROUND OF THE INVENTION

1. Field of the Invention

The present invention relates generally to distributed computing, which allows software applications to access resources distributed on a network. Specifically, the present invention relates to the use of syscall proxying to implement distributed computing for performing network penetration testing.

2. Related Art

Computer systems that are connected to a computer network, such as the Internet, must employ security measures to prevent unauthorized users from accessing these systems. The security measures must be properly designed and implemented in order to prevent unauthorized access. However, it is difficult to evaluate the effectiveness of such security measures, particularly in view of the increasing sophistication of techniques used to gain unauthorized access to computer systems.

The effectiveness of the security measures of a computer system may be evaluated by performing a computer security audit in which various aspects of computer security are analyzed and evaluated. The security audit may include a network penetration test, which is a process by which a security auditor attempts to gain unauthorized access to the computer system.

To be effective, the network penetration test must take advantage of certain characteristics of modern computer architecture, such as distributed computing. Although a great deal of work has been done in the distributed computing field and many techniques have been developed to provide the ability to distribute computing power among systems on a network, such techniques have not been optimized for use in network penetration testing.

The client/server model for distributed computing has been in use for several years. In this model, the client code is executed on a different computer than the server code. A widely accepted model for implementing client/server applications is the Remote Procedure Call method (RPC). In this model, both the client and server are programmed with special constructs and library calls to accommodate RPC. Typically, the procedures that are to be included in the RPC model are clearly specified by the developer. When one of these procedures is called in runtime, a request is built with the arguments of the called procedure, and this request is sent to the server program on the remote computer. The server program decodes the request, calls the requested procedure with the specified arguments and sends back the results to the client.

In RPC models, a lot of effort, symmetrically duplicated between the client and the server, is devoted both to converting back and forth from a common data representation format and to communicating through different calling conventions. These conversions make interoperability possible between a client and a server implemented in different platforms. Also, the RPC model attempts to attain generality, by making it possible to perform any procedure call across a network. However, in the conventional RPC model, knowledge of the intent to use RPC is required at development time. Typically, applications need to be re-written and re-built to be able to function with RPC. Thus, RPC is not suitable for scenarios in which such prior knowledge is not available, as in network penetration testing applications.

What is needed, when dealing with a family of procedure calls known as system calls ("syscalls") and when interoperability among different platforms is not necessary, is a more simple system for executing syscalls through the network. Such a system would also allow for an application to transparently access remote resources without having to be reprogrammed. More specifically, in the field of network penetration testing, there is a need for such a system that can be implemented with a small server footprint.

As discussed above, penetration testing is the practice of testing the security of a computer system by attempting to actively compromise it. Attackers take advantage of vulnerabilities in software (programming errors or bugs that relate to security) in order to obtain control of their targets. The vulnerabilities that give the attacker the ability of executing arbitrary code in the target system are usually referred to as "code injection vulnerabilities." Typical incarnations of code injection vulnerabilities are: buffer overflows and user-supplied format strings. Attacks for these vulnerabilities usually come in two steps:

(a) Injection vector (deployment). This portion of the attack is directed at exploiting the specific vulnerability and obtaining control of the target's processor.

(b) Payload. A piece of code to be executed once control is obtained.

A common piece of code used as attack payload is the "shell code," which gives the tester the ability to have interactive control of the target system through a terminal after a successful attack. However, use of shell code has certain disadvantages, as it provides only a limited interface to the compromised computer. In certain situations, a command line shell might not be accessible or executable after successful exploitation, because, for example, the vulnerable application has dropped privileges, or the shell is running inside a limited environment.

Moreover, command line interface is only as useful as the applications it can access on the target system. If the tools needed by the tester are not already available on the target, then they will have to be installed. Installing additional software to a compromised computer alters the state of the tested system and raises the possibility of leaving the system in a worst security state than before the penetration test was performed. Indeed, such installations might not be permitted by the specific penetration testing rules in place. The present invention provides a major improvement in this area, as the target system does not have to be modified in order for the tester to be able to run his tools on it.

SUMMARY OF THE INVENTION

In one aspect of the present invention, a system, method, and computer code are provided for executing a system call originating in a local computer on a first remote computer connected to the local computer via a network. Communication is established between the local computer and the first remote computer via the network. A syscall server is installed in the first remote computer. A reference address is sent from the first remote computer to the local computer via the network through execution of code by the syscall server. A syscall request is built in the local computer with arguments determined using the reference address received from the first remote computer. The syscall request is sent from the local computer to the first remote computer via the network. The syscall request is copied into a stack of the first remote computer through execution of code by the syscall server. Registers are popped from the syscall request in the stack through execution of code by the syscall server. Execution of a syscall request is initiated on the first remote computer through execution of code by the syscall server. The result of the syscall request is pushed onto the stack through execution of code by the syscall server. The result of the syscall request is sent to the local computer via the network through execution of code by the syscall server.

Embodiments of this aspect may include one or more of the following features. The building of a syscall request in the local computer may include creating a memory block in the local computer, storing syscall arguments in the memory block, and adjusting the arguments using the reference address received from the first remote computer to account for memory address differences between the first remote computer and the local computer. A series of syscalls may be executed to access a second remote computer connected to the first remote computer.

Address information for a load library function may be sent from the first remote computer to the local computer via the network through execution of code by the syscall server. In addition, address information for a get procedure address function may be sent from the first remote computer to the local computer via the network. The get procedure address function may be executed on the first remote computer through execution of code by the syscall server to obtain an address for a function to be executed. The address of the function to be executed may be incorporated in the syscall request. The address of the function to be executed may be popped from the stack prior to initiating execution of a syscall request on the first remote computer. The load library function may be executed on the first remote computer through execution of code by the syscall server to load the function to be executed.

These and other objects, features and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

DETAILED DESCRIPTION OF THE PREFERRED EMBODIMENTS

Figure 1:
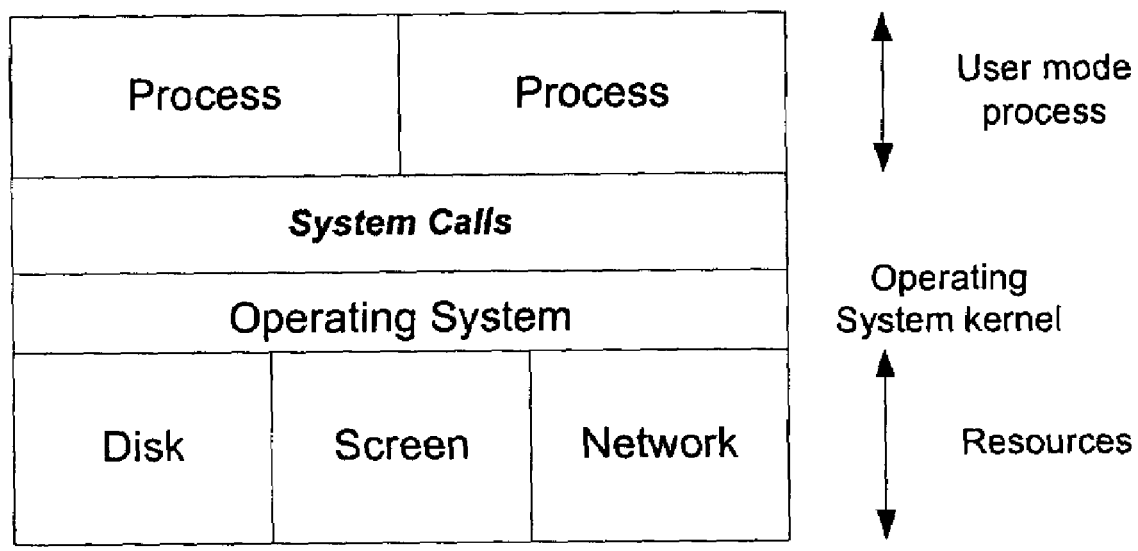
FIG. 1 is a block diagram of processes accessing resources using system calls to an operating system.

As shown in FIG. 1, a software process interacts, at some point during execution, with certain resources, such as files stored on a disk, a display screen, a networking card, a printer, etc. Assuming the process is running on a modern multi-process network operating system, it does not access these resources directly but through the underlying operating system. More specifically, the process can access these resources through system calls ("syscalls"). These system calls are operating system services, usually identified with the lowest layer of communication between a user mode process and the operating system's kernel. As used herein, the term "syscall" broadly covers any service or function that may be called for a particular operating system.

From the perspective of this process, the resources to which it has access and the type of access it has to the resources (e.g., due to a security mechanism that controls what each process can do to each resource) defines the process INPUT and OUTPUT on which computations are made. These resources define the context upon which the process executes. For example, a process that reads data from a file and outputs that data to the screen will output different data depending on the input file, as well as output different symbols depending on the output display device.

Figure 2:
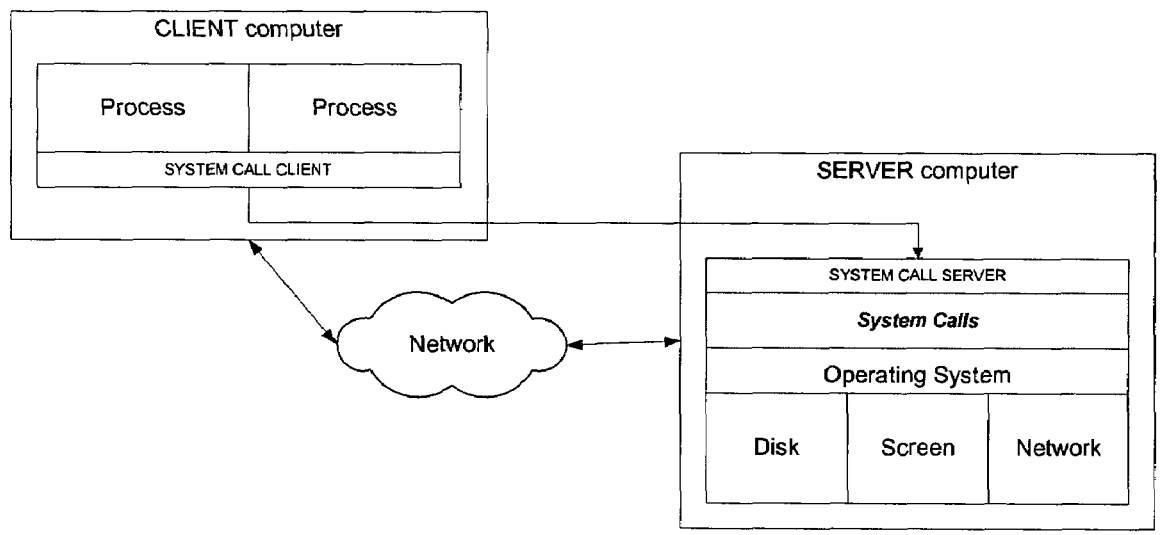
FIG. 2 is a block diagram of processes executing system calls on a remote computer using a system call client/server configuration.

As shown in FIG. 2, the present invention augments this system call interface with a client/server layer, in which the operating system serving each system call can be on a remote location, different from where the actual process is executing. Through this mechanism, the process transparently accesses resources on the remote system. Additionally, the process does not need to know the resources it is utilizing are on the remote location. By using this technique a process can transparently use remote resources with no changes on its internal logic or the way it is programmed. This technique is referred to herein as "system call proxying" or "syscall proxying."

Additionally, a novel implementation mechanism is presented as part of this invention where, by taking advantage of certain characteristics of these system calls, code on the server can be highly optimized for size, making it very small, e.g., about 100 bytes. This implementation becomes useful on applications where server size is important. One of these applications is in network penetration testing practice, where a network attack deploys a small piece of code on a target system after a successful compromise. Typically this code is a "shellcode," which is a small piece of code whose goal is to execute a command line shell on the target system. In embodiments of the present invention, a very small system call server is provided as a replacement for this shellcode. The system call server provides many advantages over prior art techniques for allowing a tester to directly interface with a remote target's operating system. As further discussed below, through this interface, the tester is not only able to take control of the target but to also launch additional attacks as if they were originating from it.

In one embodiment of the present invention, a syscall proxying arrangement is established for a UNIX system. UNIX systems use a generic and homogeneous mechanism for calling system services, typically in the form of a trap, software interrupt or a far call. System calls are classified by number, and their arguments are passed either through the stack, through registers or a combination of both. The number of system services is usually kept to a minimum (e.g., about 270 system calls in OpenBSD 2.9), as more complex functionality typically is provided on higher user-level functions in a C library.

Although these system calls are essentially a form of remote procedure call (RPC), they share some common characteristics that can be exploited. First, they share a homogeneous method for passing arguments. All the system calls share the same calling convention and typically restrict the type of their arguments to one of the following: integers, pointers to integers, pointers to memory buffers, pointers to memory structures. Second, they share a simple calling mechanism. A register is set with the number of the desired system call and a single generic trap, software interrupt or far call is executed to call into the kernel.

Taking advantage of these common characteristics, it is possible to take the above-mentioned RPC model and optimize it for this specific scenario, to reduce the code size of the system call server. In order to accomplish this goal, the present invention moves all the system calling logic and mechanism to the client component, which makes the client tightly coupled with the server platform.

The client prepares each system call argument directly in the format needed by the target operating system. In cases in which the server platform passes system call arguments via the stack, the client request will be an exact image of the server stack just before handling the syscall request. In cases in which a different method is used to pass arguments, the client request will be set in a way that can be handled by the server using a generic mechanism. For example, if the arguments are passed through registers, the client request will represent a memory block on the server stack (same as above), but the server will pop the registers from the stack just before handling the request. In this way, the client still controls the server's stack, but the registers are set to the required values. Thus, clients will be completely dependent on the server platform, and the system call server will just implement communication and a generic way of handling the client's requests.

Creating the request in the client is relatively simple for integer parameters, but not so for pointers, memory buffers or structures. This is because there is no relationship between the client and the server processes memory space. Memory addresses from the client do not make sense in the server and vice versa.

To solve this problem, when the server accepts a new connection from the client, it sends back a reference address from its memory, e.g., a pointer into the server stack or, more specifically, the server stack pointer. The client creates a memory block where it stores the arguments of the syscall, including contents of memory buffers, and uses the server reference address to adjust each pointer argument to point to the correct location within this block, which is sent as part of the request. Thus, the client can calculate the correct value for each pointer, as it will be stored in the server process stack.

Figure 3:
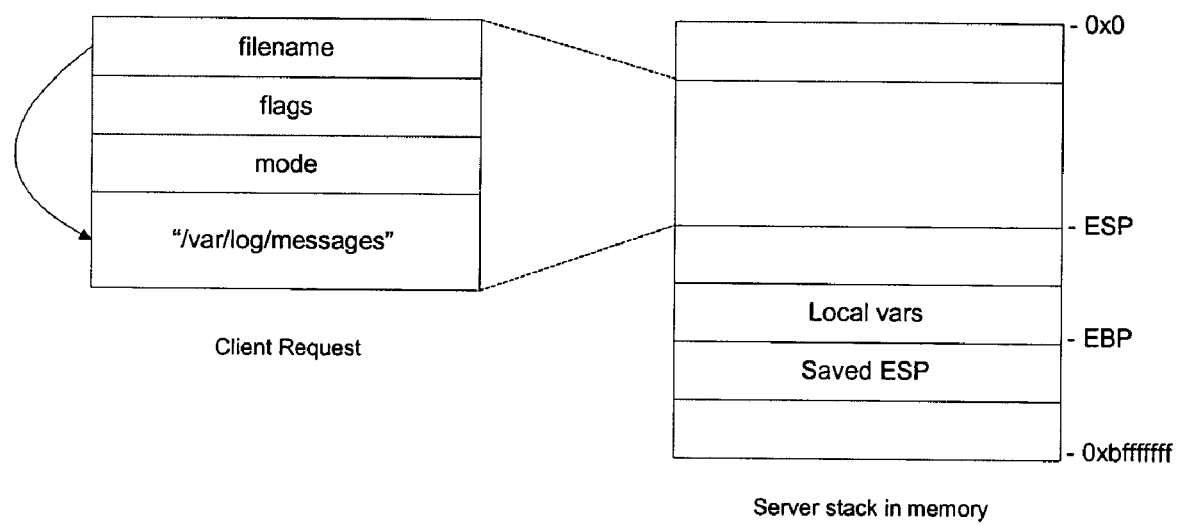
FIG. 3 is a block diagram showing the handling of arguments in a syscall request block that is passed to a server.

For example, FIG. 3 shows how arguments for a syscall to open a file ("open()") are handled. The arguments of the open() syscall—filename (which is a pointer), flags and mode—are stored in a memory block in the client. The filename pointer argument points to a memory location at the bottom of this block in which the filename is stored. This memory location may be a memory buffer that has been moved from another location within the client to form a contiguous memory block, in which case the pointer is adjusted accordingly. The filename pointer is translated into a server stack address using the reference address, e.g., the stack pointer (ESP), received from the server, so that when the block is transferred to the sever and loaded into the stack, the pointer will point to the correct address.

Figure 4:
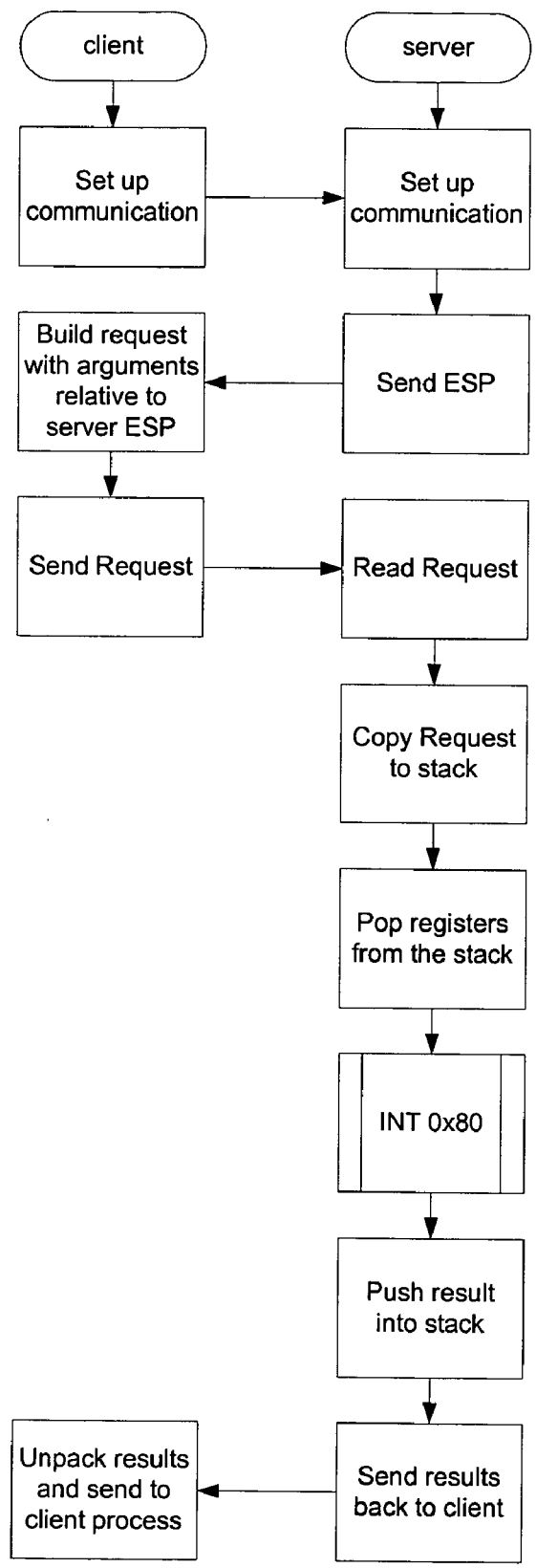
FIG. 4 is a flow chart showing execution of system calls on a remote computer using a system call client/server configuration.
Figure 5:
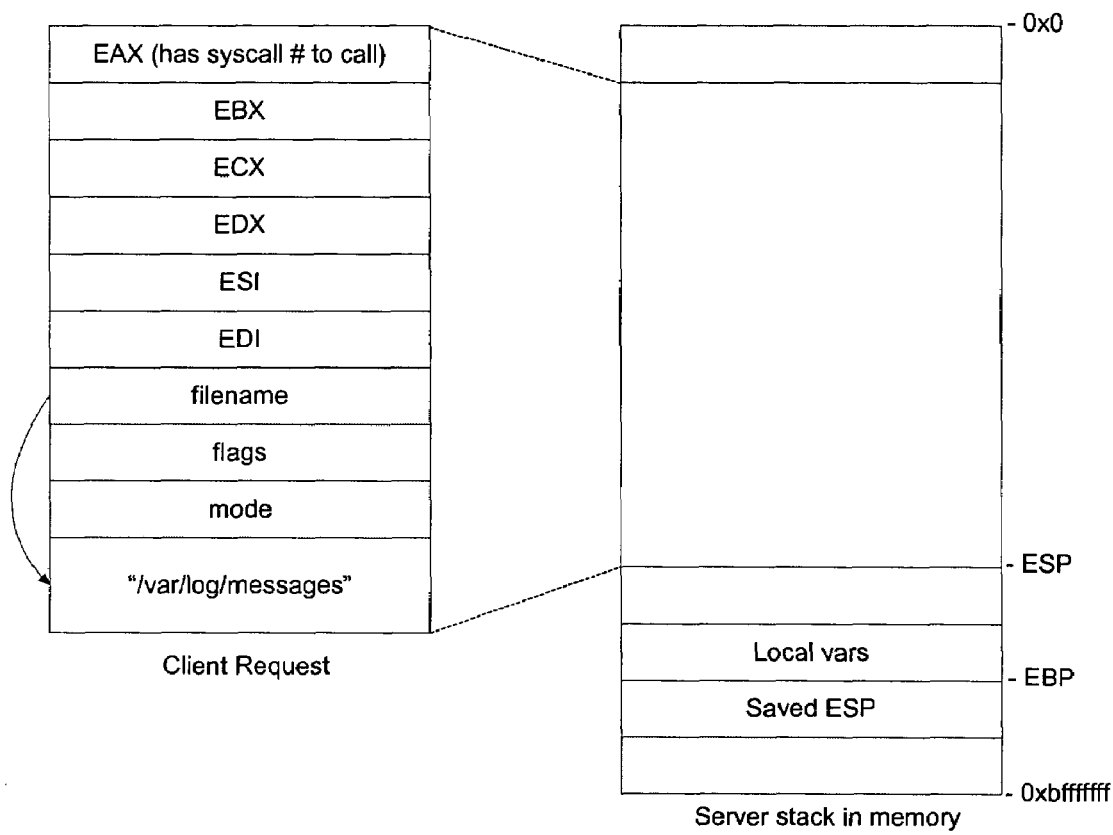
FIG. 5 is a block diagram showing the handling of arguments in a syscall request block that is passed to a server.

FIGS. 4 and 5 show an example of the execution of a syscall in an Intel Linux system using the techniques discussed above. The execution has four stages:
1. Load the EAX register with the desired system call number.
2. Load the system call arguments in the EBX, ECX, EDX, ESI, EDI registers
3. Call software interrupt 0×80 (int $0×80)
4. Check the returned value in the EAX register.

Given that a generic and simple mechanism for calling a system call exists, and using the technique explained above for argument marshalling, a system call server for this platform can be programmed as follows (in pseudo code):

| (1) | channel = set_up_communication( ) |
| (2) | channel.send(ESP) |
| (3) | while channel.has_data( ) |
| (4) | do request = channel.read( ) |
| (5) | copy request in stack |
| (6) | pop registers |
| (7) | int 0×80 |
| (8) | push eax |
| (9) | channel.send(request in stack) |

In step (1) the communication channel is set up between the client and the server, which may be, for example, a TCP/IP socket. In step (2) the stack pointer is sent back to the client, so that it can correctly re-create the server process memory addresses. In step (3), a loop is set up that operates as long as there is information on the communication channel and there are no communication errors. In step (4), the syscall request is read from the communication channel. In step (5), the request block is copied into the server stack. This step can be omitted if the request is read directly into the stack in step (4). In step (6), registers are popped from the request block in the stack (Linux passes system call arguments through registers). In step (7), a call is made into the kernel to execute the syscall. In step (8) the result of the system call is pushed into the stack. In step (9), the request block is sent back to the client. This is done to return any pointer arguments that return a value as a result of the system call (e.g., the buffer argument on a "read()" call). Sending the entire request block back to the client may be redundant in some cases, as not all of the arguments will be changed by execution of the syscall. Therefore, the syscall server may have the capability to send back only the portion of the block containing results of the syscall. However, this would increase the complexity and size of the syscall server code.

A simple implementation of this system call server for an Intel Linux system can be programmed in assembly code as follows (assuming a socket for communication is already set up on register EBX):

```
push %ebx # fd
read_request:
mov %ebp,%esp
push %esp
xor %eax,%eax
movl $4,%edx # count
read_request2:
mov $3,%al # _NR_read
mov %esp,%ecx # buff
int $0×80
add %eax,%ecx # new buff
sub %eax,%edx # byte to read
```

```
jnz read_request2 # do while not zero
pop %edx # get number of bytes in packet
sub %edx,%esp # save space for incoming data
read_request3:
movl $3,%eax # _NR_read
mov %esp,%ecx # buff
int $0x80
add %eax,%ecx # new buff
sub %eax,%edx # byte to read
jnz read_request3 # do while not zero
do_request:
pop %eax
pop %ebx
pop %ecx
pop %edx
pop %esi
pop %edi
int $0x80
push %edi
push %esi
push %edx
push %ecx
push %ebx
push %eax
do_send_answer:
mov $4,%eax # _NR_write
mov (%ebp),%ebx # fd
mov %esp,%ecx # buff
mov %ebp,%edx
sub %esp,%edx # count
int $0x80
jmp read_request
```

A example of a syscall request handled by this server—a request to call the system call open("/var/log/messages", flags, mode)—can be seen in FIG. 5. Thus, it is possible to create a simple yet very powerful system call server in a few bytes. This example of an implementation of a syscall server is only about a hundred bytes long.

In another embodiment of the present invention, a system call client and server is implemented on a Windows system. In the context of a Windows system, the term "system call" or "syscall" includes any function in a dynamic library available to a user mode process. There is a simple and common mechanism in Windows systems for loading any dynamically linked library (DLL) and calling any function in it. The Windows server uses techniques similar to those discussed above with respect to the Linux server to pass arguments between the client and the server, as arguments for DLL function calls in Windows are also passed through the stack.

As the server provides functionality to call any function in any DLL, it cannot rely on a number to identify the desired function to call, as is the case for a Linux system call. It can, however, take advantage of two special function calls that are loaded as part of a Windows process: (1) the LoadLibrary function maps the specified executable module into the address space of the calling process; and (2) the GetProcAddress function retrieves the address of an exported function or variable from the specified dynamic-link library (DLL). By using these two functions, a Windows process can load different DLLs into its memory, and obtain the address of a given function by its name.

Once again, the goal is to use a very small and simple system call server, coupled with a more complex and tightly coupled client. In this example, and to optimize server size, the server will limit its functionality to pushing the received request from the client into the stack (the client builds the stack exactly as it will look on the server before the function call), popping the address of the function to call from the stack (which is included in the client request that is pushed onto the stack) and calling the particular function. The client can then call any function that is part of the server's memory space. By providing the addresses of LoadLibrary and GetProcAddress upon session initialization, the client is able to direct the server into loading different DLLs and obtaining the addresses of specific functions within these DLLs. The client implementation can optimize calls to these two functions by keeping a cache of function addresses on the server's memory.

Given the mechanisms explained above, a sample system call server for this platform can be programmed as follows (in pseudo code):

```
(1)     channel = set_up_communication( )
(2)     channel. send(ESP)
(3)     channel.send(address of LoadLibrary)
(4)     channel.send(address of GetProcAddress)
(5)     while channel.has_data( ) do
(6)         request = channel.read( )
(7)         copy request in stack
(8)         pop ebx
(9)         call [ebx]
(10)        push eax
(11)        channel.send(request in stack)
```

In step (1), the communication channel is set up between the client and the server. In step (2), the stack pointer is sent back to the client, so that it can correctly re-create the server process memory. In step (3), the address of LoadLibrary is sent to the client, so that the client can direct the server to call it whenever it is necessary. In step (4), the address of GetProcAddress is sent to the client, so that the client can direct the server to call it whenever it is necessary. In step (5), a loop operates as long as there is information on the communication channel and there are no communication errors. In step (6), the request is read from the communication channel. In step (7), the request block is copied into the stack. This step can be skipped if the request is read directly into the stack on step (6). In step (8), the address to call is popped from the request block in the stack (the client specifies the exact address of the function to call in the server's memory). In step (9), the specified function is called. In step (10) the result of the system call is pushed into the stack. In step (11), the request block is sent back to the client. This is done to return any pointer arguments that return a value as a result of the system call (e.g., the buffer argument on a "ReadFile()" call). Sending the entire request block back to the client may be redundant in some cases, as not all of the arguments will be changed by execution of the syscall.

With this mechanism in place, the system call client can tell the server to call any function by address and return back its results. More specifically, when the client needs to call a function that cannot be found in the server's memory, it tells the server to call the special function LoadLibrary (for which the address is provided at initialization time) to load in memory the DLL where the desired function resides. After this DLL is mapped into the server process memory, the client instructs the server to call the GetProcAddress function (address of which is sent by the server to the client at initialization time) to get the address in the process memory where the desired function resides. After these two steps, the client knows the exact address of the desired function in the server process memory and can call it as many times as necessary.

Thus, even though the syscall server's internal logic is very simple and generic (for any request, the server merely pushes the request in the stack, pops the address of the function, calls that function, pushes the results and sends back the request) it is very flexible.

Figure 6:
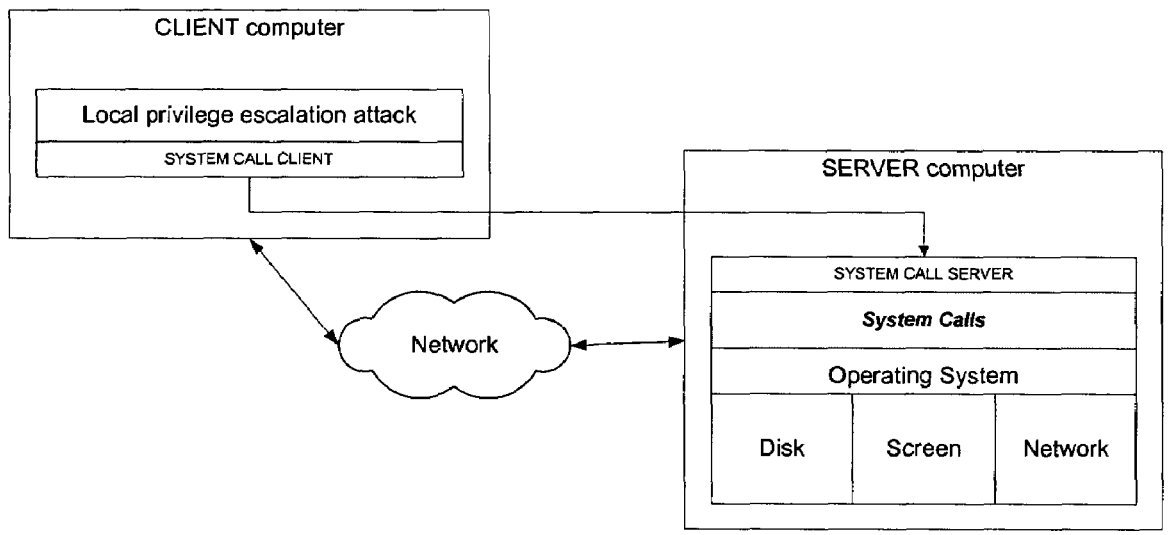
FIG. 6 is a block diagram showing the use of syscall proxying in network penetration testing.
Figure 7:
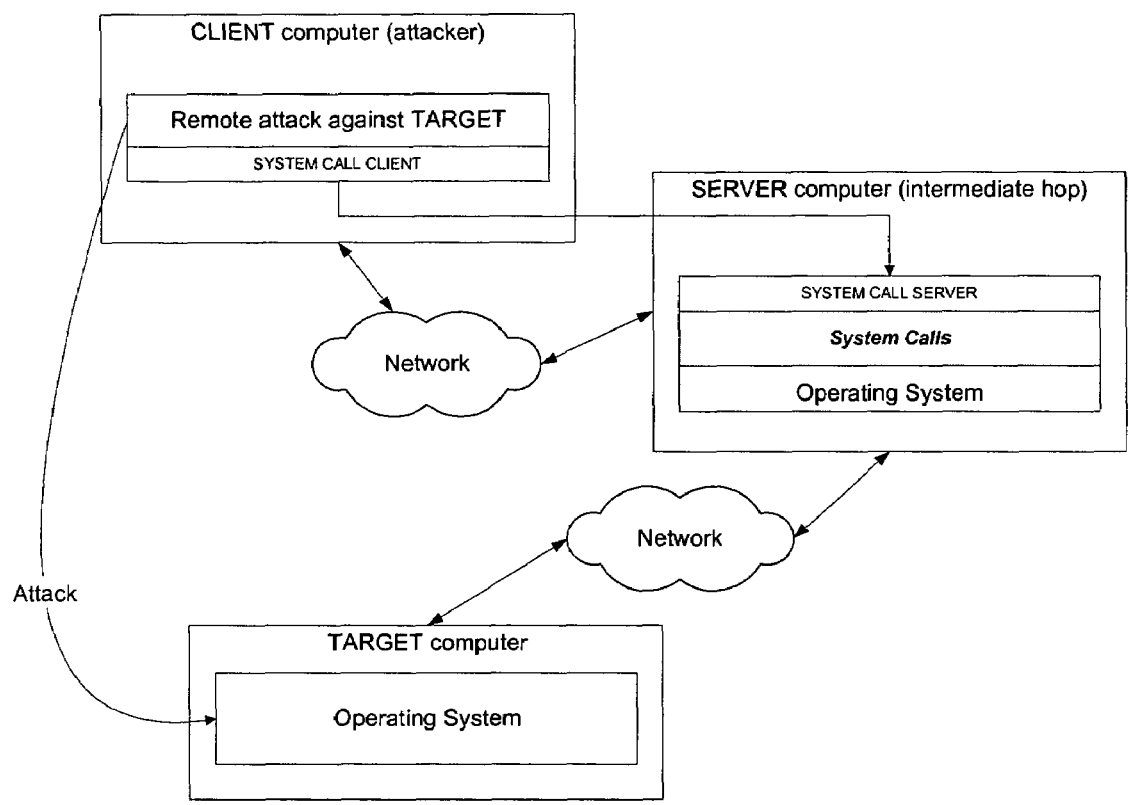
FIG. 7 is a block diagram showing the use of syscall proxying in network penetration testing to access a target system using the syscall server.

FIGS. 6 and 7 show an example of the use of syscall proxying in network penetration testing. The "privilege escalation" phase is a critical stage in a typical penetration test. A tester faces this stage when access to a target host has been obtained, usually by successfully executing an attack. Once a host's security has been compromised, access to this intermediate target allows for staging more effective attacks against the system by taking advantage of existing trust relationships between hosts and a more privileged position in the target system's network. To successfully use this compromised system as a vantage point for further attacks, the tester needs to be able to use his tools at the compromised host. This usually involves porting the tools or exploits to a different platform and deploying them on the host, sometimes including the installation of required libraries and packages and even a C compiler. This process can significantly alter the host's configuration and state, sometimes leaving the system in worst shape than it was before the test started.

In this example, a network attack for code injection vulnerabilities is configured to install a system call server instead of regular shell code. Whenever a target is successfully compromised through a code injection attack (for instance a buffer overflow attack), a small system call server is deployed. The tester now can directly interface with the target system through this system call server by using a system call client. Furthermore, any tools or software programs that the tester wishes to use on the remote system need only to be linked with the system call client in order to execute on the target host. Once this is done, whenever any of these tools accesses a resource through the system call client, they would be accessing resources on the host running the system call server. In this way, the tester can interact with the compromised computer through higher-level applications, without having to install these applications on the compromised computer.

The tester now can take advantage of the following benefits:

(a) Local privilege escalation. The tester can use the system call server to escalate privileges on the target system. Attacks that obtain limited remote access, such as those that attack vulnerabilities in services that lower the user privileges upon execution can be further explored. Once a system call server is in place, as shown in FIG. 6, the tester can use this server to attack "local" vulnerabilities on the system (vulnerabilities that presented a threat only to local users) to leverage access to higher privileges.

(b) Shell is not required. The system does not depend on the ability to install a shell, as in certain prior art approaches that rely on shell code. In certain scenarios, even though a certain system is vulnerable, it is not possible to execute a shell. The system call server does not rely on any external application and can function in such scenarios.

(c) Transparent pivoting. As shown in FIG. 7, the tester can use the system call server to launch additional attacks on other targets from the compromised system. In doing so, he can take advantage of a more privileged position into the target system's network. Thus, the tester can mimic what a real attacker would do in a cleaner fashion.

(d) Easy cleanup. After the tester is done with the system call server he can easily remove it from the target. As the server is only running in the memory of the target host, killing the syscall server process, restarting the operating system or terminating execution will completely remove the syscall server from memory.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A method for executing a system call originating in a local computer on a first remote computer connected to the local computer via a network, the method comprising:
    establishing communication between the local computer and the first remote computer via the network;
    installing a syscall server in the first remote computer;
    sending a reference address from the first remote computer to the local computer via the network through execution of code by the syscall server;
    building a syscall request in the local computer with arguments determined using the reference address received from the first remote computer;
    sending the syscall request from the local computer to the first remote computer via the network;
    copying the syscall request into a stack of the first remote computer through execution of code by the syscall server;
    popping registers from the syscall request in the stack through execution of code by the syscall server;
    initiating execution of a syscall request on the first remote computer through execution of code by the syscall server;
    pushing a result of the syscall request onto the stack through execution of code by the syscall server; and
    sending at least a portion of the result of the syscall request to the local computer via the network through execution of code by the syscall server.

2. The method of claim 1, wherein the building of a syscall request in the local computer comprises:
    creating a memory block in the local computer;
    storing syscall arguments in the memory block;
    adjusting the arguments using the reference address received from the first remote computer to account for memory address differences between the first remote computer and the local computer.

3. The method of claim 2, further comprising executing a series of syscalls to access a second remote computer connected to the first remote computer.

4. The method of claim 1, further comprising:
    sending address information for a load library function from the first remote computer to the local computer via the network through execution of code by the syscall server;
    sending address information for a get procedure address function from the first remote computer to the local computer via the network through execution of code by the syscall server.

5. The method of claim 4, further comprising:
    executing the get procedure address function on the first remote computer through execution of code by the syscall server to obtain an address for a function to be executed;

incorporating the address of the function to be executed in the syscall request; and popping the address of the function to be executed from the stack prior to initiating execution of a syscall request on the first remote computer.

6. The method of claim 5, further comprising executing the load library function on the first remote computer through execution of code by the syscall server to load the function to be executed.

7. A system for executing a system call originating in a local computer on a first remote computer connected to the local computer via a network, the system comprising:

a communications module configured to provide communication between the local computer and the first remote computer via the network;

means for building a syscall request in the local computer with arguments determined using a reference address received from the first remote computer;

means for sending the syscall request from the local computer to the first remote computer via the network; and a syscall server configured to be installed in the first remote computer, the syscall server comprising:

means for sending the reference address from the first remote computer to the local computer via the network;

means for copying the syscall request into a stack of the first remote computer;

means for popping registers from the syscall request in the stack;

means for initiating execution of a syscall request on the first remote computer;

means for pushing a result of the syscall request onto the stack; and means for sending at least a portion of the result of the syscall request to the local computer via the network.

8. Computer code stored on a computer readable medium, for executing a computer program for executing a system call originating in a local computer on a first remote computer connected to the local computer via a network, the computer code comprising: code for establishing communication between the local computer and the first remote computer via the network; code for installing a syscall server in the first remote computer; code for sending a reference address from the first remote computer to the local computer via the network through execution of code by the syscall server; code for building a syscall request in the local computer with arguments determined using the reference address received from the first remote computer; code for sending the syscall request from the local computer to the first remote computer via the network; code for copying the syscall request into a stack of the first remote computer through execution of code by the syscall server; code for popping registers from the syscall request in the stack through execution of code by the syscall server; code for initiating execution of a syscall request on the first remote computer through execution of code by the syscall server; code for pushing a result of the syscall request onto the stack through execution of code by the syscall server; and code for sending at least a portion of the result of the syscall request to the local computer via the network through execution of code by the syscall server.

9. The computer code of claim 8, wherein the code for building a syscall request in the local computer comprises:

code for creating a memory block in the local computer;

code for storing syscall arguments in the memory block;

code for adjusting the arguments using the reference address received from the first remote computer to account for memory address differences between the first remote computer and the local computer.

10. The computer code of claim 9, further comprising code for executing a series of syscalls to access a second remote computer connected to the first remote computer.

11. The computer code of claim 8, further comprising:

code for sending address information for a load library function from the first remote computer to the local computer via the network through execution of code by the syscall server;

code for sending address information for a get procedure address function from the first remote computer to the local computer via the network through execution of code by the syscall server.

12. The computer code of claim 11, further comprising:

code for executing the get procedure address function on the first remote computer through execution of code by the syscall server to obtain an address for a function to be executed;

code for incorporating the address of the function to be executed in the syscall request; and code for popping the address of the function to be executed from the stack prior to initiating execution of a syscall request on the first remote computer.

13. The computer code of claim 12, further comprising code for executing the load library function on the first remote computer through execution of code by the syscall server to load the function to be executed.

* * * * *